July 29, 1924.
L. P. CHRISTIANSEN
TWO-TOOTH SETTER
Filed June 11, 1923
1,503,151
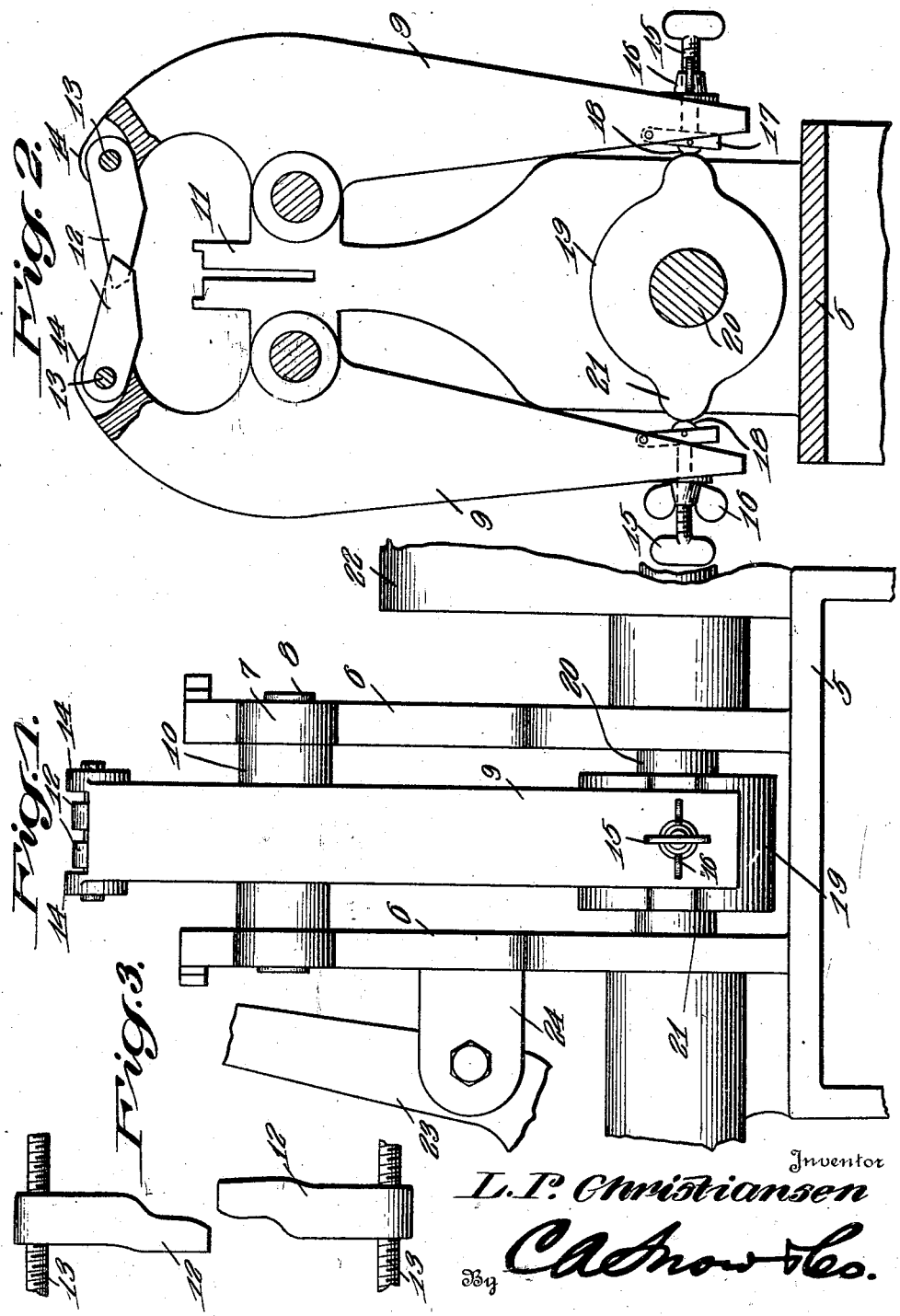

Patented July 29, 1924.

1,503,151

UNITED STATES PATENT OFFICE.

LAWRENCE PETER CHRISTIANSEN, OF IRON MOUNTAIN, MICHIGAN.

TWO-TOOTH SETTER.

Application filed June 11, 1923. Serial No. 644,702.

*To all whom it may concern:*

Be it known that I, LAWRENCE P. CHRISTIANSEN, a citizen of the United States, residing at Iron Mountain, in the county of Dickinson and State of Michigan, have invented a new and useful Two-Tooth Setter, of which the following is a specification..

This invention relates to saw tooth setting machines, and aims to provide novel means whereby the teeth of a saw may be readily and easily set, the machine being of a construction to operate on a pair of teeth simultaneously, setting the teeth in opposite directions.

Another object of the invention is to provide a machine of this character wherein the setting dogs may be adjusted with respect to each other, to regulate the movement of the dogs to cause them to set the teeth of a saw various distances, on opposite sides of the saw blade.

Another object of the invention is to provide means for adjusting the setting dogs transversely of their supporting members adapting the device for use in connection with saws wherein the teeth are of various widths.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a rear elevational view of the upper portion of the machine.

Figure 2 is a side elevational view thereof, parts thereof being shown in section.

Figure 3 is a detail view of the setting dogs.

Referring to the drawings in detail, the reference character 5 designates the base of the machine, which may be of any desired construction and provided with suitable securing means whereby the base may be secured to a suitable bench not shown.

Extending upwardly from the base 5 are spaced vertical supports 6 that are provided with enlargements 7 formed with openings to receive the shafts 8 on which the movable arms 9 are pivotally supported.

Spacing sleeves 10 are disposed between the arms 9 and supports 6 so that the arms 9 will be held securely against lateral movement to insure against the setting dogs moving laterally while the machine is in operation.

The supports 6 are formed with alining saw receiving slots 11 in which the saw under operation is positioned, and due to the spaced relation of the supports 6, it will be obvious that movement of the saw to defeat the purpose of the invention, is eliminated. The setting dogs are indicated by the reference character 12 and have pivotal connection with the arms 9 through the supporting screws 13. These screws 13 move through threaded openings formed adjacent to the rear ends of the setting dogs 12, the spaces between the bearings 14 formed at the upper ends of the arms 9 being sufficient to permit of transverse adjustment of the setting dogs 12 to move the setting dogs towards and away from each other and adapting the device for use in setting saws having teeth of various widths.

At the opposite end of the arms 9, are adjusting screws 15 that move through the threaded bearings 16 and engage the pivoted roller supports 17, the rollers 18 being mounted in the supports and designed to engage the double ended cams 19 mounted on the shaft 20 to rotate therewith.

As shown, the cam 19 is formed with enlargements 21 moving into engagement with the rollers 18 so that upon every rotation of the cam 19, the lower ends of the arms 9 move outwardly, moving the upper ends thereof into engagement with the teeth supported adjacent thereto, which setting dogs move the teeth in opposite directions to set them.

A motor 22 is shown as connected with the shaft 20 and imparts rotary movement to the shaft and cam 19 supported thereon. It might be further stated that the present device is especially designed for use in setting the teeth of band saws, and to this end an arm 23 is provided, which arm is pivotally supported by the laterally extending arms 24 and controlled by the movements of the shaft 20 to cause the arm 23 to rock on its supporting shaft.

It is obvious that with each movement of the arm 23, the upper end thereof, which has connection with the saw moves the saw a distance to bring another pair of teeth to their setting positions opposite the setting dogs 12.

I claim:—

In a saw set, a base, supports extending upwardly from the base, a pair of pivoted arms mounted on the supports, adjustable setting dogs mounted at the upper ends of the arms, adjusting screws disposed at the lower ends of the arms, pivoted roller supports adapted to be engaged by the adjusting screws, and adjusted towards and away from the arms, and a double ended cam engaging the pivoted roller supports to move the arms with respect to each other.

In testimony that I claim the foregoing as my own, I have hereto affixed my signature in the presence of two witnesses.

LAWRENCE PETER CHRISTIANSEN.

Witnesses:
F. W. WARNER,
ELMER G. ANDERSON.